United States Patent
Emrick et al.

(10) Patent No.: US 11,808,388 B2
(45) Date of Patent: Nov. 7, 2023

(54) FLUID COUPLING

(71) Applicant: Eaton Intelligent Power Limited, Dublin (IE)

(72) Inventors: Benjamin Emrick, Baltimore, MD (US); Emmanuel Matthews, Laurel, MD (US); Jonathan D. Murray, Greenbelt, MD (US)

(73) Assignee: Eaton Intelligent Power Limited, Dublin (IE)

( * ) Notice: Subject to any disclaimer, the term of this patent is extended or adjusted under 35 U.S.C. 154(b) by 439 days.

(21) Appl. No.: 16/804,462

(22) Filed: Feb. 28, 2020

(65) Prior Publication Data

US 2020/0278062 A1 Sep. 3, 2020

Related U.S. Application Data

(60) Provisional application No. 62/812,389, filed on Mar. 1, 2019.

(51) Int. Cl.
*F16L 23/10* (2006.01)

(52) U.S. Cl.
CPC .................... *F16L 23/10* (2013.01)

(58) Field of Classification Search
CPC .................. F16L 23/10; F16L 23/08
See application file for complete search history.

(56) References Cited

U.S. PATENT DOCUMENTS

| | | | |
|---|---|---|---|
| 3,600,770 A * | 8/1971 | Halling | B65D 45/32 |
| | | | 285/411 |
| 4,611,839 A | 9/1986 | Rung et al. | |
| 5,257,834 A * | 11/1993 | Zeidler | F16L 23/04 |
| | | | 285/910 |

(Continued)

FOREIGN PATENT DOCUMENTS

| EP | 1 766 279 B1 | 12/2010 |
|---|---|---|
| GB | 732442 A | 6/1955 |

(Continued)

OTHER PUBLICATIONS

French Office Action, 2001920, dated May 18, 2020.
Translation of French Office Action, 2001920, dated May 18, 2020.

*Primary Examiner* — James M Hewitt, II
(74) *Attorney, Agent, or Firm* — Merchant & Gould P.C.

(57) ABSTRACT

A fluid coupling includes a body including a plurality of segments and one or more links connecting the segments in a substantially annular configuration. At least one of the one or more links may be adjustable to modify a diameter of the body. The body may have a substantially U-shaped a cross-section with a first tapered portion, a second tapered portion, a first planar portion, a second planar portion, and/or a third planar portion. The body may include a first rounded corned and a second rounded corner. The first planar portion may be disposed substantially between the first tapered portion and the first rounded corner, the second planar portion may be disposed substantially between the first rounded corner and the second rounded corner, and/or the third planar portion may be disposed substantially between the second rounded corner and the second tapered portion.

20 Claims, 8 Drawing Sheets

(56) References Cited

U.S. PATENT DOCUMENTS

| | | | | |
|---|---|---|---|---|
| 5,454,606 | A | * | 10/1995 | Voss ........................ F16L 23/10 285/410 |
| 7,425,023 | B2 | * | 9/2008 | Hartig ..................... F16L 23/08 285/365 |
| 2008/0093844 | A1 | * | 4/2008 | Casey ..................... F16L 23/22 285/135.2 |
| 2017/0254455 | A1 | * | 9/2017 | Brendel ................ F16L 23/162 |
| 2019/0017635 | A1 | | 1/2019 | Belen et al. |
| 2019/0145559 | A1 | * | 5/2019 | Karlsson ................ F16L 23/08 285/411 |

FOREIGN PATENT DOCUMENTS

| | | | |
|---|---|---|---|
| GB | 877638 A | * | 9/1961 |
| WO | 2011/056512 A1 | | 5/2011 |

* cited by examiner

FLUID COUPLING

CROSS-REFERENCE TO RELATED APPLICATION

This application claims the benefit of U.S. Provisional Patent Application Ser. No. 62/812,389, filed on Mar. 1, 2019, the disclosure of which is hereby incorporated by reference in its entirety as though fully set forth herein.

TECHNICAL FIELD

The present disclosure generally relates to fluid couplings, including fluid couplings that may, for example, be used in connection with aircraft.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some fluid couplings may not be configured for use with high pressures, high temperatures, and/or high bending torques, and may include short fatigue lives.

There is a desire for solutions/options that minimize or eliminate one or more challenges or shortcomings of fluid couplings. The foregoing discussion is intended only to illustrate examples of the present field and is not a disavowal of scope.

SUMMARY

In embodiments, a fluid coupling may include a body including a plurality of segments and one or more links connecting the segments in a substantially annular configuration. At least one of the one or more links may be adjustable to modify a diameter of the body. The body may have a substantially U-shaped a cross-section with a first tapered portion, a second tapered portion, a first planar portion, a second planar portion, and/or a third planar portion. The body may include a first rounded corned and a second rounded corner. The first planar portion may be disposed substantially between the first tapered portion and the first rounded corner, the second planar portion may be disposed substantially between the first rounded corner and the second rounded corner, and/or the third planar portion may be disposed substantially between the second rounded corner and the second tapered portion.

The foregoing and other potential aspects, features, details, utilities, and/or advantages of examples/embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments of the present disclosure, examples of which are described herein and illustrated in the accompanying drawings. While the present disclosure will be described in conjunction with embodiments and/or examples, they do not limit the present disclosure to these embodiments and/or examples. On the contrary, the present disclosure covers alternatives, modifications, and equivalents.

Figure 1:
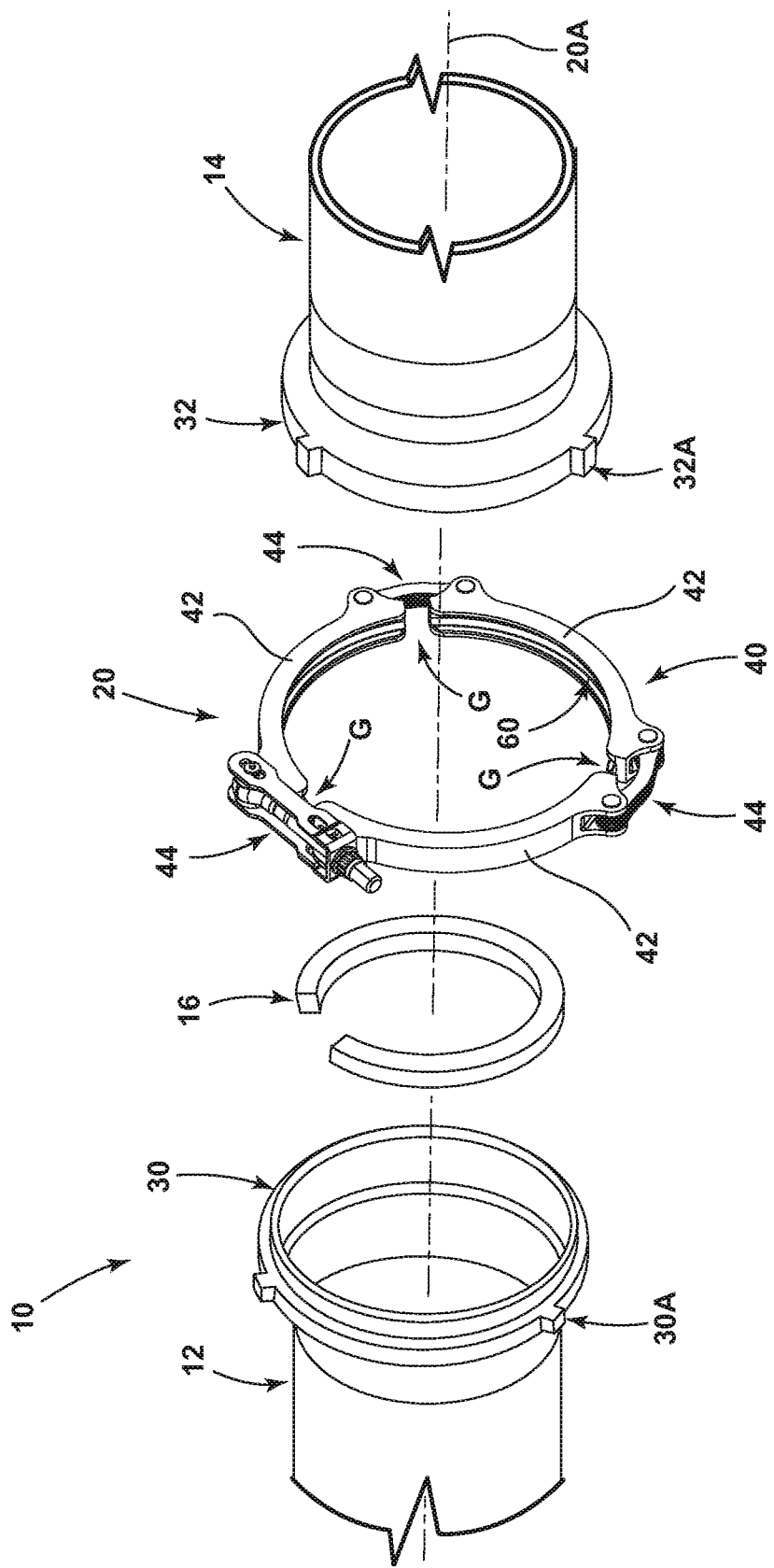
FIG. 1 is an exploded perspective view generally illustrating an embodiment of a fluid system according to teachings of the present disclosure.

In embodiments, such as generally illustrated in FIG. 1, a fluid system 10 may include a first fluid conduit 12, a second fluid conduit 14, a seal 16, and/or a fluid coupling 20. The first fluid conduit 12 and/or the second fluid conduit 14 may include one or more of a variety of shapes, sizes, configurations, and/or materials. For example and without limitation, the first fluid conduit 12 and the second fluid conduit 14 may be rigid metal ducts that may include cylindrical configurations and that may include a first flange 30 and a second flange 32, respectively. The flanges 30, 32 may be integrally formed and/or connected to the fluid conduits 12, 14, such as at or about ends of the fluid conduits 12, 14. The first fluid conduit 12, the second fluid conduit 14, the seal 16, and/or the fluid coupling 20 may be configured for use with high-temperature and/or high-pressure fluids. For example and without limitation, the first fluid conduit 12, the second fluid conduit 14, the seal 16, and/or the fluid coupling 20 may be configured for use with aircraft bleed air and may be configured for use with fluid pressures of at least 750 psig and/or fluid temperatures of at least 1000 degrees Fahrenheit. The seal 16 and/or the fluid coupling 20 may be configured to connect the first fluid conduit 12 with the second fluid conduit 14 in a sealed manner. The fluid system 10 may be configured as and/or integrated with an aircraft bleed air system.

Figure 2:
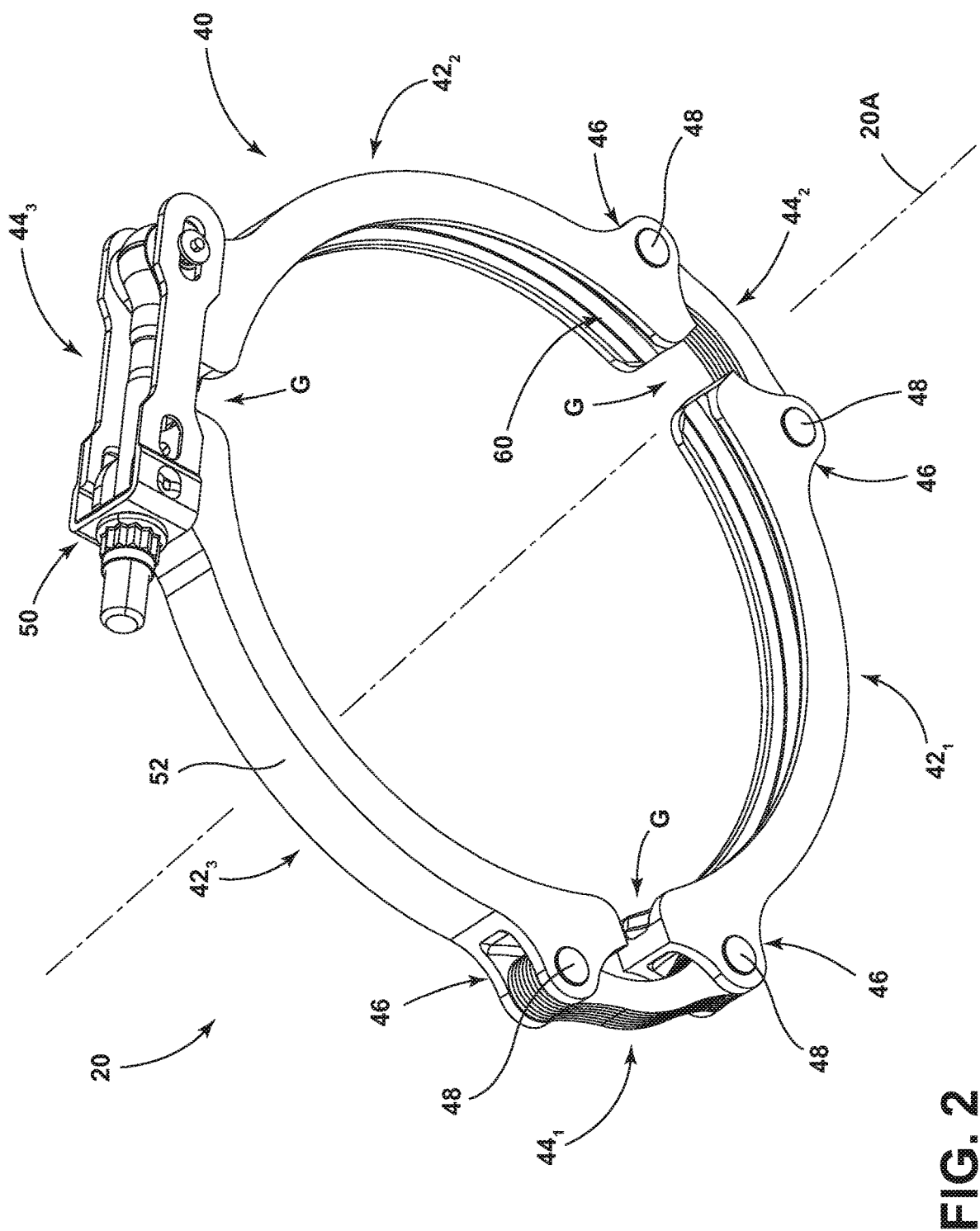
FIG. 2 is a perspective view generally illustrating an embodiment of a fluid coupling according to teachings of the present disclosure.
Figure 3:
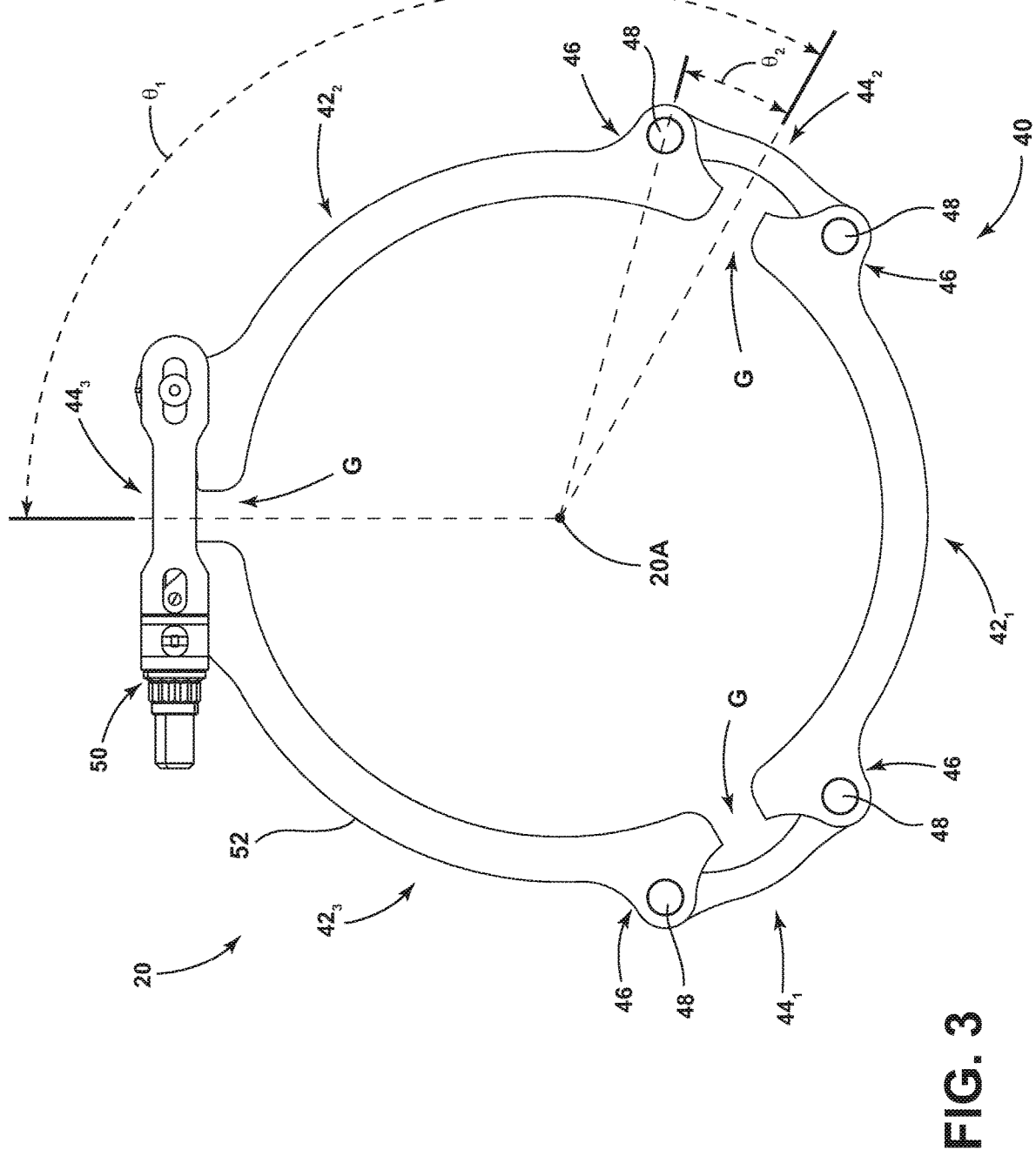
FIG. 3 is a side view generally illustrating an embodiment of a fluid coupling according to teachings of the present disclosure.

With embodiments, such as generally illustrated in FIGS. 2 and 3, a fluid coupling 20 may include an axis 20A and/or a body 40. The body 40 may include one or more segments 42 and/or one or more links 44 that may connect the one or more segments 42. The one or more segments 42 may, for example and without limitation, include three segments (e.g., segments 42₁, 42₂, 42₃) and/or arcuate configurations. The one or more links 44 may include three links (e.g., links 44₁, 44₂, 44₃) and/or may connect the segments 42 in a substantially annular configuration. The segments 42 may include lugs 46 that may be configured for connection with the one or more links 44, such as via fasteners 48 (e.g., rivets). The fasteners 48 may be connected to the lugs 46 and the links 44 (e.g., may extend through the lugs 46 and the links 44). The segments 42 may be connected such that a circumferential gap G is present between adjacent segments 42. The gaps G may be configured to at least partially receive tabs 30A, 32A of the flanges 30, 32 (see, e.g., FIG. 1). The links 44 may be rotatably connected to the segments 42, such as via the fasteners 48.

In embodiments, the links 44 may, for example and without limitation, include a curved or angled configuration (e.g., may be curved links). A curvature of curved links 44 may be configured to accommodate and/or receive tabs 30A, 32A of the flanges 30, 32. In environments where more extreme operating conditions may be possible or expected, the tabs 30A, 32A of the flanges 30, 32 may be larger (e.g., longer in the radial direction) than tabs of other flanges. The longer tabs 30A, 32A may be configured to restrict and/or prevent other types of couplings (e.g., couplings that are not configured for high stress applications, such as AS1895 Type 1 and Type 2 couplings) from being connected to the flanges 30, 32. For example and without limitation, the longer tabs 30A, 32A may prevent Type 1 or Type 2 couplings from latching onto the flanges 30, 32.

In embodiments, curved links 44 may be configured to deform or deflect (e.g., straighten out) at least to some degree, such as when subjected to high stress. The curvature/angle may allow for additional deformation, which may provide stress relief prior to shearing of the lugs 46/fasteners 48 and/or other failure of the fluid coupling 20.

With embodiments, one or more of the links 44 may be configured as an adjustable link (see, e.g., link 44₃). An adjustable link 44₃ may be configured to adjust an inner diameter of the fluid coupling 20, such as to reduce the inner diameter and clamp the fluid coupling 20 onto the fluid conduits 12, 14 (e.g., onto the flanges 30, 32). An adjustable link 44₃ may, for example and without limitation, include a screw and nut arrangement 50 that may be screwed together (or unscrewed) to adjust the distance between two adjacent segments 42 (e.g., segments 42₂, 42₃) of the body 40, which may adjust the inner diameter of the fluid coupling 20 and/or adjust a clamping force of the fluid coupling 20.

With embodiments, such as generally illustrated in FIG. 3, the lugs 46 of a segment 42 may be offset from the end of the segment 42, such as by a circumferential distance D. With higher load specifications/expectations, larger fasteners 48 may be utilized to withstand shear loads and larger lugs 46 may be utilized with the larger fasteners 48. Larger lugs 46 may result in more of a rotational effect that may increase stress at the end of the segment 42. Offsetting the lugs 46 from the end of the segment 42 may reduce the stress at the end of the segment 42 and/or at least partially compensate for the increased lug size. The lugs 46 of a segment 42 may, for example and without limitation, be offset from the end of the segment 42 by about 8% to about 12%, such as about 10%, of the length of the segment 42. With embodiments, for example and without limitation, a segment 42 may include an arcuate extent of about 100 degrees to about 120 degrees (see, e.g., angle $\theta_1$), such as about 112 degrees, and the lugs 46 may be offset from the end of the segment 42 by about 9 degrees to about 13 degrees (see, e.g., angle $\theta_2$), such as about 11 degrees. The links 44 may be offset in a radial direction from an outer surface 52 of the segments 42 and/or may only contact the segments 42 at or about the lugs 46, such as when the fluid coupling 20 is clamped with the fluid conduits 12, 14. The outer surface 52 may be substantially rectangular and/or may not include portions that are significantly rounded or curved.

Figure 4:
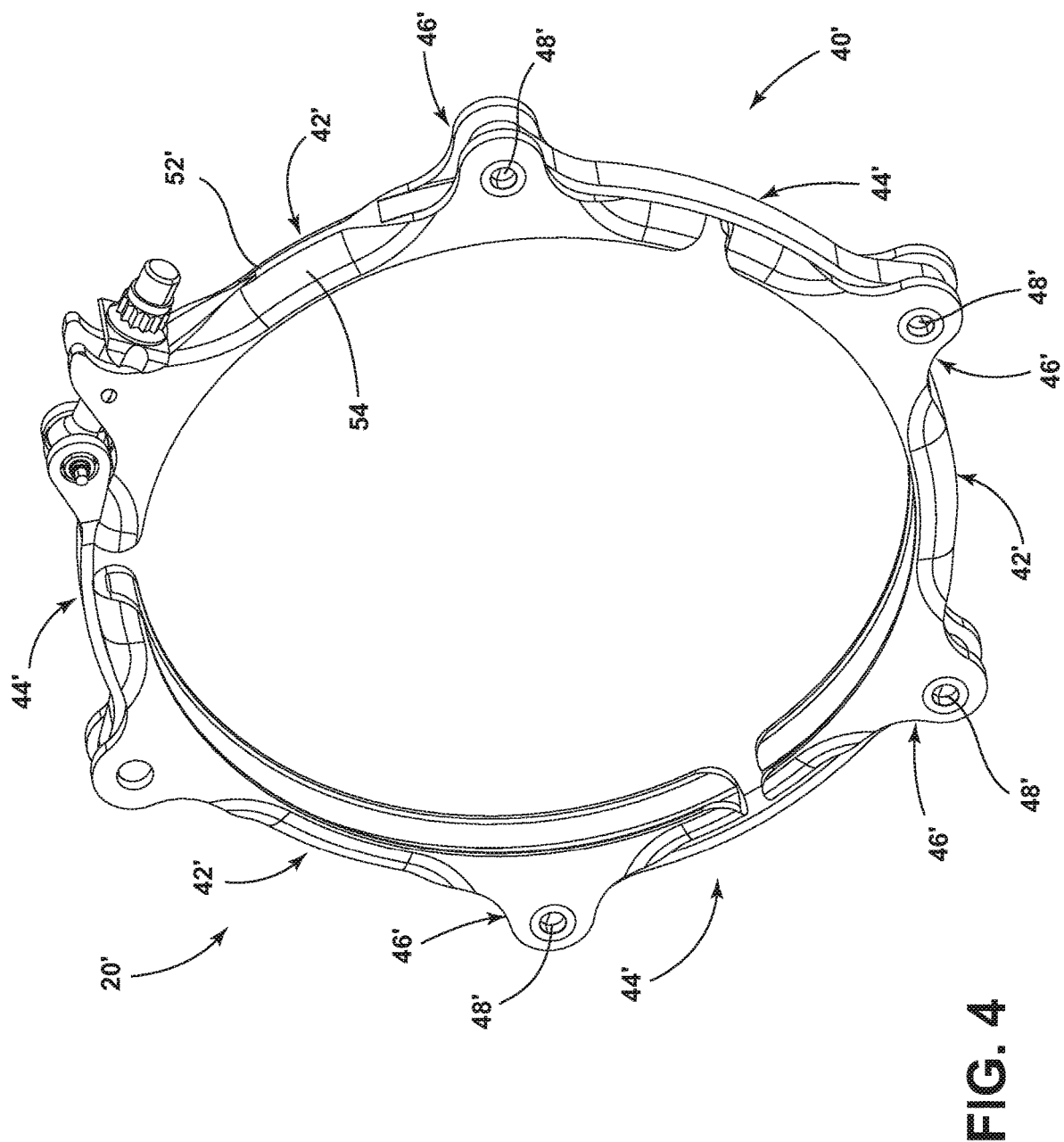
FIG. 4 is a perspective view generally illustrating an embodiment of a fluid coupling according to teachings of the present disclosure.
Figure 5:
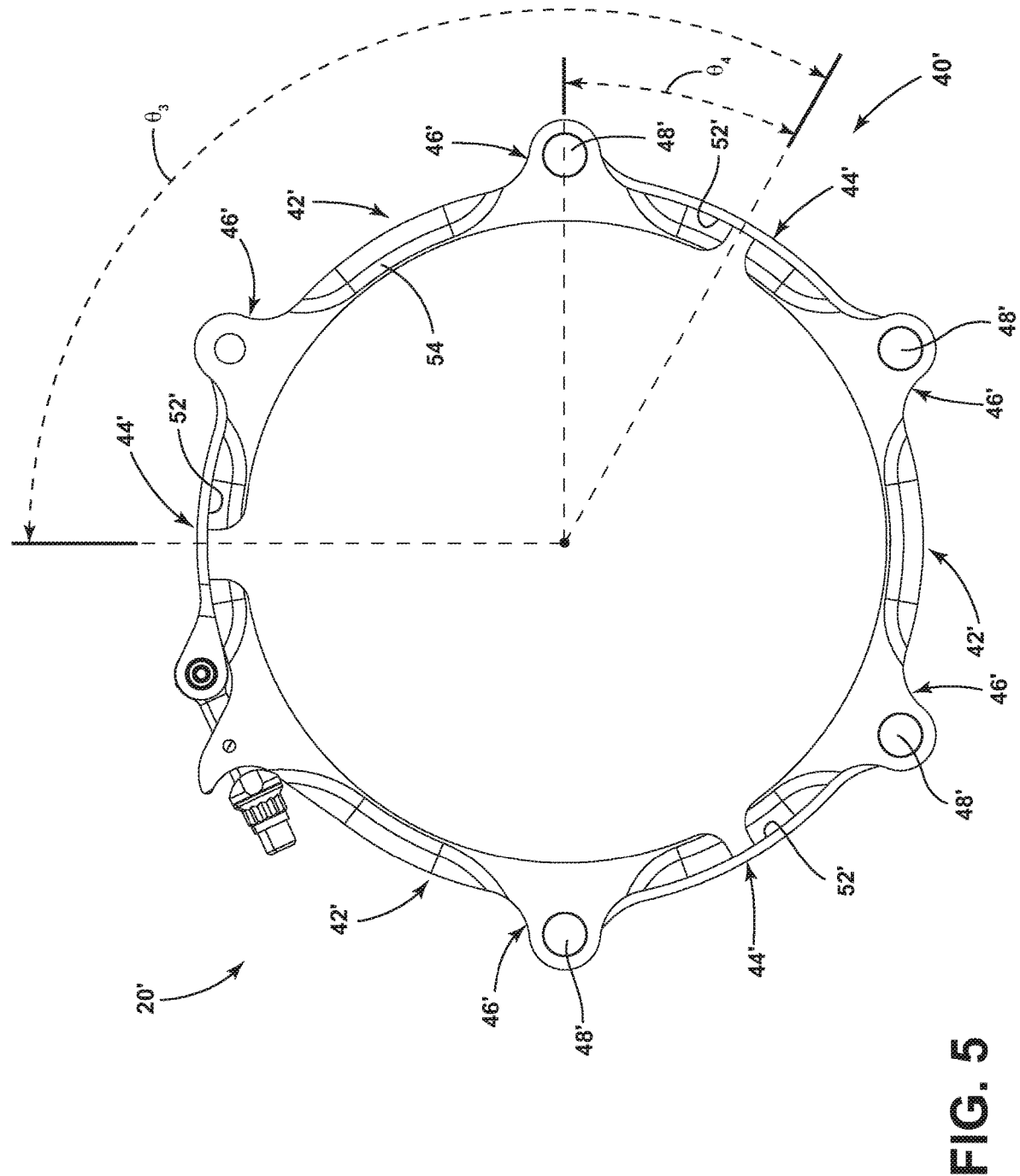
FIG. 5 is a side view generally illustrating an embodiment of a fluid coupling according to teachings of the present disclosure.

With embodiments, such as generally illustrated in FIGS. 4 and 5, a fluid coupling 20' may include a body 40' having a plurality of segments 42' that may be connected via respective links 44'. The links 44' may be connected to the segments 42' via lugs 46' and fasteners 48' (e.g., rivets). The lugs 46' may be offset from the ends of the segments 42'. The lugs 46' of a segment 42' may, for example and without limitation, be offset from the end of the segment 42' by about 20% to about 30%, such as about 24%, of the length of the segment 42. With embodiments, for example and without limitation, a segment 42' may include an arcuate extent of about 100 degrees to about 120 degrees (see, e.g., angle $\theta_3$), such as about 116 degrees, and the lugs 46' may be offset from the end of the segment 42' by about 25 degrees to about 30 degrees (see, e.g., angle $\theta_4$), such as about 28 degrees. The links 44' may be substantially in contact with an outer surface 52' of the segments 42'. The outer surface 52' of the segments 42' may include one or more rounded or curved portions 54.

Figure 6:
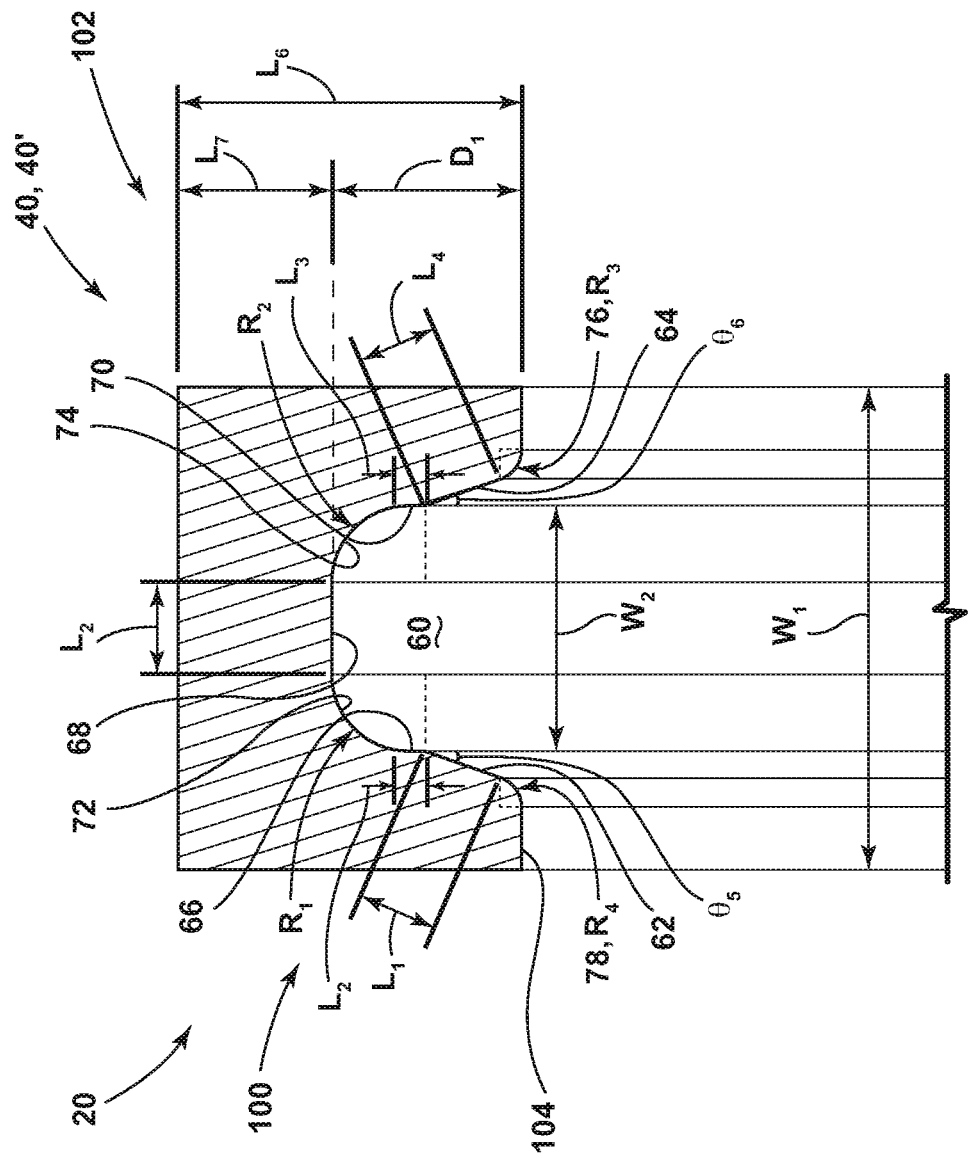
FIG. 6 is a cross-sectional view generally illustrating portions of an embodiment of a fluid coupling according to teachings of the present disclosure.
Figure 7:
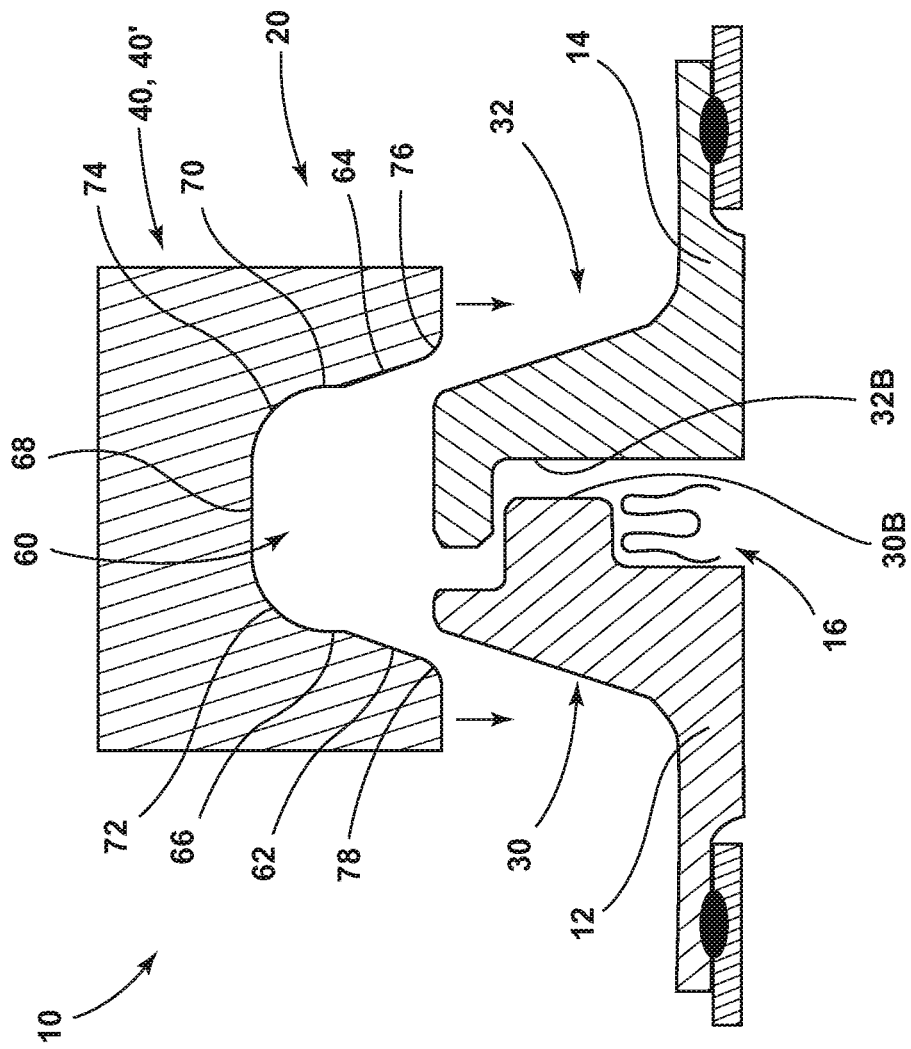
FIG. 7 is a cross-sectional view generally illustrating portions of embodiments of a fluid coupling, a first fluid conduit, a second fluid conduit, and a seal according to teachings of the present disclosure.

In embodiments, such as generally illustrated in FIG. 6, the body 40, 40' of a fluid coupling 20, 20' (e.g., the segments 42, 42') may include a substantially U-shaped configuration (e.g., cross-sectional shape) that may open radially inward. The body 40, 40' may include a recess/channel 60 that may be configured to at least partially receive and/or retain the first flange 30 and the second flange 32 (see, e.g., FIGS. 7 and 8), such as to restrict and/or prevent relative movement between the first fluid conduit 12 and the second fluid conduit 14.

In embodiments, the body 40, 40' (e.g., the segments 42, 42') may include a first tapered portion 62, a second tapered portion 64, a first planar portion 66, a second planar portion 68, a third planar portion 70, a first rounded corner 72, a second rounded corner 74, a third rounded corner 76, and/or a fourth rounded corner 78. The first tapered portion 62, the first planar portion 66, the first rounded corner 72, and/or the fourth rounded corner 78 may be disposed at or about a first side 100 of the body 40, 40'. The second tapered portion 64, the third planar portion 70, the second rounded corner 74, and/or the third rounded corner 76 may be disposed at or about a second side 102 of the body 40, 40' that may be opposite the first side 100. The second planar portion 68 may be disposed at or about a middle of the body 40, 40', such as between (or at a junction of) the first side 100 and the second side 102. The third rounded corner 76 and/or the fourth rounded corner 78 may be external corners that may be disposed at an inner surface 104 of the body 40, 40' and/or that may contact the second fluid conduit 14 and the first fluid conduit 12, respectively.

With embodiments, the first tapered portion 62 may extend from the fourth rounded corner 78, such as in a substantially radially outward direction. The first tapered portion 62 may extend at an angle $\theta_5$ relative to the radial direction. The angle $\theta_5$ may, for example and without limitation, be about 15 degrees to about 25 degrees, such as about 19 degrees. The first planar portion 66 may extend from the first tapered portion 62. The first planar portion 66 may be substantially parallel with the radial direction and/or the circumferential direction. The first rounded corner 72 may be disposed at or about an end of the first planar portion 66. The first planar portion 66 may be referred to as a step portion and/or may function as a step or intermediate portion between the first tapered portion 62 and the first rounded corner 72. The second planar portion 68 may extend from the first rounded corner 72, such as in a substantially axial direction. The second planar portion 68 may be substantially parallel with the axial direction and/or the circumferential direction. The second planar portion 68 may extend from the first rounded corner 72 to the second rounded corner 74. The second rounded corner 74 may be disposed opposite the first rounded corner 72. The third planar portion 70 may extend from the second rounded corner 74, such as in a substantially radial direction. The third planar portion 70 may be substantially parallel with the radial direction, the circumferential direction, and/or the first planar portion 66. The second tapered portion 64 may extend from the third planar portion 70 to the third rounded corner 76. The third planar portion 70 may be referred to as a step portion and/or may function as a step or intermediate portion between the second tapered portion 64 and the second rounded corner 74. The second tapered portion 64 may extend between the third rounded corner 76 and the third planar portion 70, such as in a substantially radially outward direction. The second tapered portion 64 may extend at an angle $\theta_6$ relative to the radial direction. The angle $\theta_6$ may, for example and without limitation, be about 15 degrees to about 25 degrees, such as about 19 degrees.

With embodiments, the first tapered portion 62 may include a length $L_1$, the first planar portion 66 may include a length $L_2$, the second planar portion 68 may include a length $L_3$, the third planar portion 70 may include a length $L_4$, and/or the second tapered portion 64 may include a length $L_5$. The first rounded corner 72 may include a radius $R_1$, the second rounded corner 74 may include a radius $R_2$, the third rounded corner 76 may include a radius $R_3$, and/or the fourth rounded corner 78 may include a radius $R_4$. The body 40, 40' (e.g., the segments 42, 42') may include a width $W_1$ (e.g., in the axial direction) and/or a length $L_6$ (e.g., in the radial direction). The recess 60 may include a depth $D_1$ (e.g., in the radial direction). The recess 60 may include a width $W_2$ (e.g., between the first planar portion 66 and the third planar portion 70. The body 40, 40' (e.g., the segments 42, 42') may include a length $L_7$ between the outer radial end of the recess 60 and the outer end of the body 40, 40'. The length $L_7$ may be equal to the length $L_6$ less the depth $D_1$. Non-limiting examples of possible values of lengths $L_1$-$L_7$, radii $R_1$-$R_4$, widths $W_1$, $W_2$, and depth $D_1$ are provided in Table 1.

TABLE 1

| Dimension | Value (in) |
| --- | --- |
| $R_1$ | 0.1 |
| $R_2$ | 0.1 |
| $R_3$ | 0.04 |
| $R_4$ | 0.04 |
| $L_1$ | 0.11 |
| $L_2$ | 0.04 |
| $L_3$ | 0.12 |
| $L_4$ | 0.04 |
| $L_5$ | 0.11 |
| $L_6$ | 0.45 |
| $L_7$ | 0.2 |
| $W_1$ | 0.63 |

TABLE 1-continued

| Dimension | Value (in) |
| --- | --- |
| $W_2$ | 0.32 |
| $D_1$ | 0.25 |

In embodiments, the first planar portion 66 and/or the third planar portion 70 may be shorter than the second planar portion 68. The first planar portion 66 and/or the third planar portion 70 may be shorter than the first tapered portion 62 and/or the second tapered portion 64. The second planar portion 68 may be at least twice as long as the first planar portion 66. The radius $R_1$ of the first rounded corner 72 may be greater than about 0.05 inches, such as about 0.1 inches. The radius $R_3$ of the third rounded corner 76 may be smaller (e.g., at least 40% smaller) than the radius $R_1$ of the first rounded corner 72.

In embodiments, the first planar portion 66 and the third planar portions 70 may be configured to permit the first rounded corner 72 and the second rounded corner 74 to have relatively large radii $R_1$, $R_2$, such as while maintaining at least a minimum length $L_3$ of the second planar portion 68. A minimum length $L_3$ of the second planar portion 68 may correspond to the widths of the first flange 30 and the second flange 32. For example and without limitation, maintaining large radii $R_1$, $R_2$, and/or a minimum length $L_3$ of the second planar portion 68 may limit and/or prevent significant interference between outer ends of the flanges 30, 32 and the rounded corners 72, 74, which may limit stress at or about the rounded corners 72, 74. The flanges 30, 32 may be compliant with the AS1895 standard.

With embodiments, a thickness of the fluid coupling 20 may be determined, at least in part, via the width $W_1$ of the body 40, 40' and the length $L_7$. Merely increasing either or both of these dimensions may not sufficiently improve the overall robustness or fatigue life of the fluid coupling 20 (e.g., allow the fluid coupling 20 to withstand increased pressures, bending torques, and/or temperatures for a significant number of cycles). For example and without limitation, increasing the width $W_1$ and/or the length $L_7$ (e.g., relative to other dimensions) may increase the stress at the rounded corners 72, 74, such as due to a stress concentration effect. Such increased stress could make the fluid coupling 20 more susceptible to fracture and/or result in a shorter fatigue life.

Embodiments of a fluid coupling 20, which may include a stepped recess 60 (e.g., with planar portions 66, 70), may be more robust and/or include a longer fatigue life than other couplings. For example and without limitation, other couplings, such as those without a stepped recess, may have a fatigue life of and/or be susceptible to failure at or about 80,000 use cycles/tests. In contrast, embodiments of fluid couplings 20 may have a significantly longer fatigue life and/or may withstand significantly more cycles, such as at least about 4,000,000 use cycles/tests (e.g., 50 times as many use cycles/tests).

With embodiments, a method of connecting a fluid coupling 20 with fluid conduits 12, 14 may include providing a first fluid conduit 12, a second fluid conduit 14, and/or a fluid coupling 20. The first fluid conduit 12 and the second fluid conduit 14 may be moved such that a first flange 30 of the first fluid conduit 12 and a second flange 32 of the second fluid conduit 14 are aligned, connected, adjacent, and/or engaged with each other. The fluid coupling 20 may be disposed about the flanges 30, 32 such that a recess/channel 60 of the fluid coupling 20 is substantially aligned with the flanges 30, 32. The fluid coupling 20 may be clamped onto the flanges 30, 32 and/or the fluid conduits 12, 14, such as via an adjustable link 44₃ that may be configured to adjust the inner diameter of the fluid coupling 20. The fluid coupling 20 may be tightened until a threshold torque and/or clamping force is achieved. In a tightened and/or clamped configuration, the flanges 30, 32 may be disposed at least partially in curved corners 72, 74 of the recess 60 such that stress generated by the flanges 30, 32 at or about the curved corners 72, 74 is minimized (see, e.g., FIG. 8). In a tightened and/or clamped configuration, the flanges 30, 32 may be disposed at least partially between (e.g., in an axial direction) opposing planar portions 66, 70 that may be substantially parallel to each other.

Figure 8:
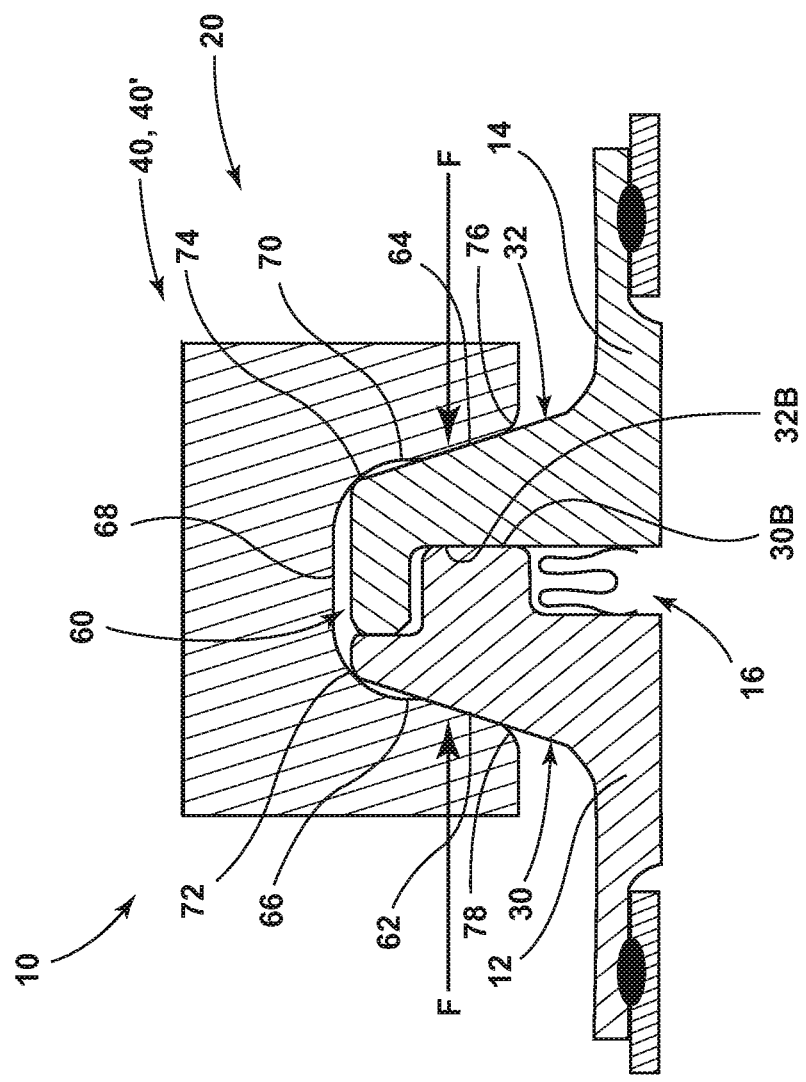
FIG. 8 is a cross-sectional view generally illustrating portions of embodiments of a fluid coupling, a first fluid conduit, a second fluid conduit, and a seal according to teachings of the present disclosure.

In embodiments, a fluid coupling 20 may be connected to flanges 30, 32 of fluid conduits 12, 14 such that a clamping force F is applied by the fluid coupling 20 to the flanges 30, 32 at or about corresponding mating surfaces 30B, 32B of the flanges 30, 32 (see, e.g., FIG. 8). The mating surfaces 30B, 32B may be offset from (e.g., radially inward of) outer ends of the flanges 30, 32. For example and without limitation, the mating surfaces 30B, 32B may be disposed in a middle section (e.g., a middle 60% or so) of the flanges 30, 32.

While embodiments of a fluid coupling 20, 20' are generally illustrated with three segments 42, 42', fluid couplings 20, 20' may include greater or fewer segments 42, 42'.

In embodiments, the first fluid conduit 12, the second fluid conduit 14, and/or the fluid coupling 20, 20' may be configured for fluid pressures of at least 750 psig, temperatures of at least 1000 degrees Fahrenheit, and/or at least 15,000 in-lbs of bending torque.

In embodiments, the fluid couplings 20, 20' may be configured to effectively extend the capabilities of AS1895 flanges for higher/more extreme operating conditions without modification of the flanges. Modification of the AS1895 flanges may involve creating a new industry standard, which may be time-consuming, inefficient, and/or expensive. Fluid conduits with AS1895 flanges may be compatible with higher pressures and temperatures, but other coupling designs may not be. Utilizing embodiments of the fluid couplings 20, 20' with AS1895 flanges may provide a fluid system configured for use with pressures, temperatures, and/or bending torques significantly above the AS1985 requirements.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples, "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples, "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

What is claimed is:

1. A fluid coupling, comprising:
a body including a plurality of segments including a first segment and a second segment, each of the segments having opposite ends and an ear offset from each end by an end length extending from the end along a circumference of the body;
a plurality of links connecting the segments in a substantially annular configuration with an interior diameter and an exterior diameter, a first of the links having a first end coupled to a first ear of the first segment and a second end coupled to a second ear of the second segment, the first link defining a concave curvature between the first and second ends, the concave curvature disposed outside of the interior diameter and facing an interior of the annular configuration, the first link spanning a first end length of the first segment, a circumferential gap between the first segment and the second segment, and a second end length of the second segment;

wherein at least one of the plurality of links is adjustable to modify a diameter of the body; and the body has a substantially U-shaped cross-section with a first tapered portion, a second tapered portion, a first planar portion, a second planar portion, and a third planar portion.

2. The fluid coupling of claim 1, wherein the body includes a first rounded corner and a second rounded corner.

3. The fluid coupling of claim 2, wherein the first planar portion is disposed substantially between the first tapered portion and the first rounded corner;
the second planar portion is disposed substantially between the first rounded corner and the second rounded corner; and
the third planar portion is disposed substantially between the second rounded corner and the second tapered portion.

4. The fluid coupling of claim 2, wherein a radius of the first rounded corner is greater than about 0.05 inches.

5. The fluid coupling of claim 2, wherein the body includes a third rounded corner and a fourth rounded corner.

6. The fluid coupling of claim 5, wherein a radius of the third rounded corner is at least 40% smaller than a radius of the first rounded corner.

7. The fluid coupling of claim 1, wherein the first planar portion and the third planar portion are shorter than the second planar portion.

8. The fluid coupling of claim 7, wherein the first planar portion and the third planar portion are shorter than the first tapered portion and the second tapered portion.

9. The fluid coupling of claim 1, wherein the first tapered portion is disposed at an angle of about 15 degrees to about 25 degrees.

10. The fluid coupling of claim 9, wherein the angle is about 19 degrees.

11. The fluid coupling of claim 1, wherein the second planar portion is at least twice as long as the first planar portion.

12. The fluid coupling of claim 1, wherein the body include a recess formed, at least in part, by the first tapered portion, the second tapered portion, the first planar portion, the second planar portion, and the third planar portion; and
the recess is configured to at least partially receive and retain a first flange of a first fluid conduit and a second flange of a second fluid conduit.

13. The fluid coupling of claim 1, wherein the body is configured to at least partially receive and retain AS1985 joints.

14. The fluid coupling of claim 1, wherein the body and the plurality of links are configured to apply a clamping force to corresponding mating surfaces of flanges of fluid conduits; and
said corresponding mating surfaces are radially offset from outer edges of said flanges.

15. An aircraft bleed air system, comprising:
a first fluid conduit including a first flange;
a second fluid conduit including a second flange; and
a fluid coupling retaining the first flange and the second flange, the fluid coupling comprising:
a body including a plurality of segments including a first segment and a second segment each of the segments having opposite ends and an ear offset from each end by an end length extending from the end along a circumference of the body;
a plurality of links connecting the segments in a substantially annular configuration with an interior diameter and an exterior diameter, a first of the links having a first end coupled to a first ear of the first segment and a second end coupled to a second ear of the second segment, the first link defining a concave curvature between the first and second ends, the concave curvature disposed outside of the interior diameter and facing an interior of the annular configuration, the first link spanning a first end length of the first segment, a circumferential gap between the first segment and the second segment, and a second end length of the second segment;
wherein at least one of the plurality of links is adjustable to modify a diameter of the body and clamp the body onto the first flange and the second flange; and
a cross-section of the body is substantially U-shaped with a first tapered portion, a second tapered portion, a first planar portion, a second planar portion, and a third planar portion.

16. The aircraft bleed air system of claim 15, wherein the first planar portion is disposed substantially between the first tapered portion and a first rounded corner;
the second planar portion is disposed substantially between the first rounded corner and a second rounded corner; and
the third planar portion is disposed substantially between the second rounded corner and the second tapered portion.

17. The aircraft bleed air system of claim 16, wherein the first fluid conduit and the second fluid conduit are rigid metal ducts; and
the first fluid conduit, the second fluid conduit, and the fluid coupling are configured for fluid pressures of at least 750 psig and at least 15,000 in-lbs of bending torque.

18. The aircraft bleed air system of claim 16, wherein the plurality of segments includes three segments and the plurality links includes three links connecting the three segments together.

19. The aircraft bleed air system of claim 15, wherein the plurality of links include at least two curved links; and
the concave surfaces of the curved links are configured to receive respective tabs of the first flange and/or the second flange.

20. The aircraft bleed air system of claim 15, wherein the first flange and the second flange include corresponding mating surfaces that are radially offset from ends of the first flange and the second flange; and
the fluid coupling applies a clamping force to the first flange and the second flange at or about the corresponding mating surfaces.

* * * * *